July 21, 1964     A. SOMMER     3,141,857
FOAMING AGENT FOR MAKING CELLULAR CONCRETE, AND
METHOD OF MAKING SAME
Filed Jan. 27, 1960

INVENTOR.
ALOIS SOMMER
BY Berman & Berman
ATTORNEYS

United States Patent Office 3,141,857
Patented July 21, 1964

3,141,857
FOAMING AGENT FOR MAKING CELLULAR CONCRETE, AND METHOD OF MAKING SAME
Alois Sommer, Hamburg-Wilhelmsburg, Germany
(% Dr. Ing. H. Negendank, Neuer Wall 41, Hamburg 36, Germany)
Filed Jan. 27, 1960, Ser. No. 4,934
7 Claims. (Cl. 260—2.5)

This application is a continuation-in-part of copending application Serial No. 386,121, filed October 14, 1953.

The present invention relates to cellular concrete and to methods for producing the same, and also to special foam producing agents adapted to produce a foam useful in the production of such concrete.

The present invention has utility in the production of cellular concrete useful as a floor plaster and also well adapted to form concrete stones, plates or blocks, and also for ceiling installations.

It is an object of the present invention to produce such cellular concrete which when foamed and not yet set will have a high degree of stability so that the foam will not collapse upon subsequent admixture of a mineral filler.

Another object of the present invention is the provision of cellular concrete which when set and cured will have good elasticity, high strength in compression, tension and shear, low density, good heat and sound insulating properties, and good spreadability without cracking.

Still another object of the present invention is the provision of a cellular concrete having very low water absorption properties.

It is a further object of the present invention to provide methods for the production of cellular concrete having these desirable characteristics.

Still another object of the present invention is the provision of foaming agents useful in the production of cellular concrete having the above characteristics.

Finally, it is an object of the present invention to provide cellular concrete and methods and agents for producing the same, which will be relatively inexpensive to provide, easy to compound and apply, and rugged and durable when set and cured.

Figure 1:
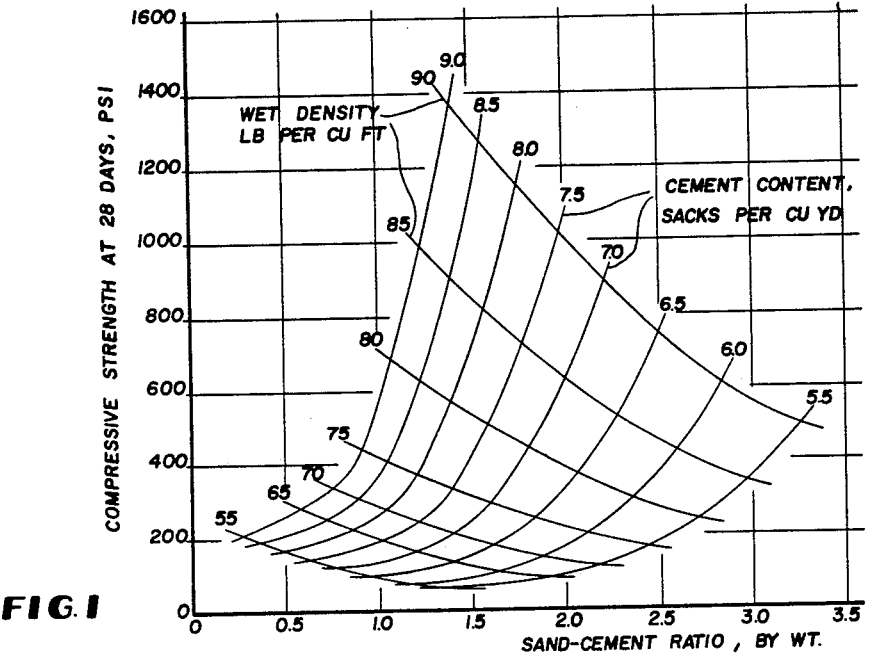
Figure 2:
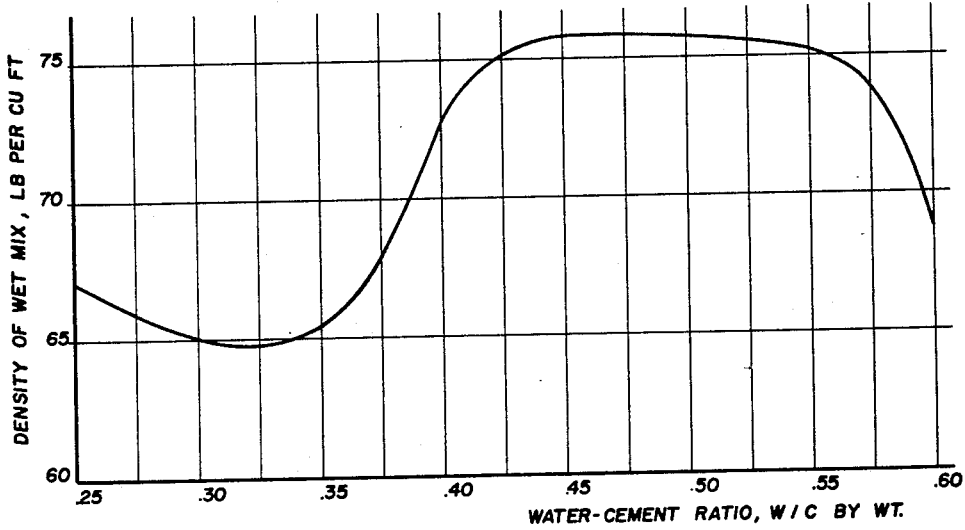

Other objects and advantages of the present invention will become apparent from a consideration of the following description taken in connection with the accompanying drawing, in which:

FIGURE 1 is a graphical representation of the compressive strength of cured foamed concrete according to the present invention, plotted against the ratio of mineral filler to cement, with parameters for wet density and cement content of the foamed mixture; and FIGURE 2 is a graphical representation of density of the wet foamed mix of the present invention, plotted against the ratio of mineral filler to cement.

Broadly, the present invention comprises a method of producing cellular concrete, and cellular concrete produced by that method, in which a foam is formed by violently agitating Portland cement with water in admixture with a small amount of a foaming agent according to the present invention, and thereafter adding mineral filler of special particle size.

The Cement

The cement of the present invention is Portland cement. A representative type of weight percent composition of this cement is as follows:

| | Percent |
|---|---|
| $SiO_2$ | 19–24 |
| $Al_2O_3 + TiO_2$ | 4–9 |
| $Fe_2O_3$ | 1.6–6 |
| CaO | 60–67 |
| MgO | 0.6–3 |
| $SO_3$ | 1–3 |

The Mineral Filler

The mineral filler is sand, gravel, mineral rubble, or fine crushed rock. The filler is accurately characterized as finely divided and has a range of particle sizes that does not exceed about 7 mm. in diameter. It is important that at least about 20% by weight of the filler be of a particle size less than 0.2 mm. in diameter. In this respect, the filler is distinctively different from the usual Portland cement fillers, in which the weight percentage of filler of less than 0.2 mm. particle size is substantially less than about 20% and sometimes as low as about 2%. The range of particle size of the present invention, however, is important in the environment of the present invention, namely, a porous concrete, because it has been discovered that the relatively high proportion of fines of the present invention promotes uniform embedding of the air bubbles in the concrete mix. With too great a percentage of coarse fillers, the pore structure is not uniform and also the strength of the foamed concrete decreases. With a substantial proportion of filler of particle size greater than 7 mm., the foam tends to collapse, and also the large grains tend to settle out.

Filler-Cement Ratio

As is usual in a concrete, the ratio of filler to cement is subject to wide variation. In the present invention, however, the filler is of greater weight than the cement, but not more than about three times as great as the weight of the cement. FIGURE 1 shows various filler-cement ratios for foamed concrete according to the present invention in terms of wet density and compressive strength when fully cured. The data for FIGURE 1 are based on a water-cement ratio of 0.45 by weight.

Water-Cement Ratio

FIGURE 2 is a representative plot of density of the wet mix after foaming, against water-cement ratio, by weight. As is there seen, there is no increase in density of the wet mix after a water-cement ratio of about 0.5 is reached. As would be expected, therefore, there is a corresponding drop-off of strength of the hardened and cured concrete when water-cement ratios of about 0.5 are exceeded. For maximum strength and other desirable structural characteristics, ratios of about 0.4–0.5 are preferred. Within this range, greatest mechanical strength of the cellular concrete is obtained, and also the time needed for setting is reduced.

The Foaming Agent

The foaming agent of the present invention is used in a small but effective amount, based on the weight of the cement, of not less than about 0.3% by weight. At percentages somewhat higher than this figure, there is a corresponding increase in the lightness of the foamed concrete, that is, the density of the concrete varies inversely as the proportion of foaming agent, up to about 1% by weight of the concrete. Above about 1%, there is no corresponding increase in desirable properties imparted by an increase in the quantity of foaming agent such as would justify the increased cost of greater quantities of foaming agent. Therefore, a preferred proportion of foaming agent is about 0.6 to 0.8% by weight of the cement.

The components of the foaming agent are as follows:

*Polyvinylchloride.*—This substance is present in the foaming agent in the amount of about 20–25% by weight of the foaming agent, or in a small amount not less than about 0.06% by weight of the cement. Use in excess of about 0.25% by weight of the cement is merely wasteful for purposes of the present invention. This substance serves to stabilize the bubbles of the foam thereby to prevent collapse of the foam during transport or working of the concrete. It is admixed in the foaming agent in the form of a fine powder and it apparently performs its useful function of stabilizing the foam by precipitating on the walls of the air bubbles to strengthen them by deposition. It may, for example, have a polymerization degree of 1,000–2,000. Copolymers of vinylchloride with vinyl acetate or vinylidine chloride are also equivalent and may be used instead of polyvinylchloride in the same proportion. It is especially to be noted that the use of polyvinylchloride in this connection is not at all the same as the use of polyvinyl resin emulsion as a binder for foamed substances, for the amount of polyvinylchloride used in the present invention is so small that it has no such effect.

*Alkylnaphthylene sulphonate.*—This substance is present in the foaming agent in the amount of about 40–45% by weight of the foaming agent, or in a small amount not less than about 0.12% by weight of the cement. Use in an amount more than about 0.5% by weight of the cement is merely wasteful for purposes of the present invention. It should be water-soluble, and for this purpose should be the sodium, potassium or ammonium salt or the like. The alkyl group is a straight chain or branched chain hydrocarbon group containing 4–10 carbon atoms, and may for example be butyl, iso-butyl, hexyl, 2,4 dimethylbutyl, octyl, isooctyl, 2,2 dimethylhexyl, or decyl. This substance is the principal foam-forming substance of the foaming agent. In admixture in a Portland cement foam, it behaves in a peculiar way quite different from the other members of the chemical groups to which it belongs. For example, this substance is a well known surfactant; but it evidently is not functioning as such in the present invention, for a number of other surface active sulphates and sulphonates which have been tested in an attempt to find substances equivalent to this substance have fallen far short of the performance of this substance with regard to the degree and effectiveness with which a foam is produced in the particular environment of the present invention. Specifically, a much more highly and uniformly porous foam is produced in the presence of and despite an unusually low water content.

*Alginate or polyacrylic acid ester.*—This substance is a member selected from the class consisting of water-soluble salts of alginic acid and water-dispersible esters of polyacrylic acid. Examples of the water-soluble salts of alginic acid are sodium, potassium and ammonium alginate. Sodium alginate is preferred. The esters of polyacrylic acid are the lower alkyl esters, for example, the methyl, ethyl, propyl, butyl, iso-butyl and hexyl esters. Ethyl polyacrylate is preferred. The esters are present in aqueous emulsion and are commercially available, for example under the trademark "Acronal" of Badische Anilin- & Soda-Fabrik AG. The selected substance is present in an amount of about 13–17% by weight of the foaming agent, or in a small amount not less than about 0.04% by weight of the cement. Use in an amount more than about 0.2% by weight of the cement is merely wasteful for purposes of the present invention. The selected substance is macromolecular and performs a number of useful functions in the foam. In the first place, it strengthens the foam and makes the foam more elastic and workable while preventing its collapse. Apparently, this substance is not deposited in the air bubbles nor along the walls of the bubbles, but rather lodges between the walls of the pores so that it is dispersed among the filler and bitumen. It increases the plasticity of the mortar and renders the foam more uniform, and also serves to bind the water content in an even distribution throughout the foam so that, in effect, tiny pockets of water are held available throughout the lattice work of the foam, for use by the cement during setting. In addition to buoying up the foam, it assures that water is available to the walls of the bubbles, which further strengthens the bubble structure and reduces the tendency of the bubbles to break and the foam to collapse. Finally, it improves the mechanical strength of the freshly mixed foam so as better to resist the admixture of mineral filler which otherwise would tend to collapse the foam.

*Remainder of the foam formulation.*—If desired, about 4–6% by weight of the foaming agent of an alkali such as sodium or potassium hydroxide or sodium carbonate may be included to control the consistency of the foaming agent; but this is not essential to the present invention. Otherwise, the balance of the foaming agent is essentially water, so that the foaming agent is handled in liquid form.

The Bitumen

A small but effective amount of an aqueous bituminous emulsion is incorporated in the concrete as a waterproofing agent. It also serves to lend flexural strength to the concrete. The bituminous constituent is the internal or discrete phase of the emulsion while the water is the external or continuous phase. Such emulsions are known in the art, and reference for a fuller description is had to U.S. Patents Nos. 2,560,871, July 17, 1951, and 2,483,806, October 4, 1949. The bituminous portion of the emulsion may comprise up to about 80% of the emulsion by weight, or the bituminous content may be reduced with water to 10% or less. About 55% is the most usual commercial form and is therefore preferred.

The emulsion may be added at any stage of the process and is used in an amount between about 0.5 and 5% by weight of the bituminous portion on the weight of the cement, preferably about 1% by weight. Thus, for an emulsion containing about equal parts of bituminous material and water, 2% by weight of the cement is preferred. With regard to the bituminous component alone, at concentrations higher than about 2½% the compressive strength begins to fall off; and higher than about 1½% the tensile strength begins to fall off.

Procedure

The water and cement are mixed together with the foaming agent and violently agitated. For this purpose, there may be used a 17 cubic foot mixer comprising a horizontally disposed drum having a central rotor rotatable on a horizontal axis and carrying four equally spaced radially extending screens of which the square openings of the mesh are 14–15 mm. The rotor may be turned at about 60 r.p.m.

The mineral filler is then folded into the stable foam thus formed. The bituminous emulsion may be added at any desired stage, such as with the filler; and the strength and stability of the foam is such that the emulsion may even be added to the mixture before foaming.

The procedure is characterized by the improved feature that not all the water which is used to make the concrete is present during the foam formation. Instead, only a portion of the water is whipped up with the cement and foaming agent into the stable foam, the remainder of the water being added after the foam is formed, for example, with the mineral filler. It has been found that by this procedure, the foam as initially formed is both of less density and of greater strength and has less tendency to collapse upon subsequent addition of the filler. Of course, the proportion of the total water which is used in forming the foam varies according to the water-cement ratio. However, on the basis of the cement, it is preferred that the water-cement ratio at the time of foaming be about 0.4. This can then be increased by additions of water after production of the foam, for example along with the mineral filler, until a final water-cement ratio of about 0.5 is reached. The final water-cement ratio should be between about 0.25 and about 0.50, preferably about 0.40–0.50.

Thus, in addition to improving the strength and stability of the foam by keeping the overall water-cement ratio low, further strength and stability are imparted to the foam and the production of air bubbles is enhanced, by using less than all the desired water for production of the foam.

Illustrative Example

To enable those skilled in this art to practice the invention, the following illustrative example is given:

Thirty-five lbs. of water, 94 lbs. of Portland cement and 0.66 lb. of foaming agent are put into a mixing vessel as described above. The cement has the following composition:

| | Percent |
|---|---|
| $SiO_2$ | 22 |
| $Al_2O_3 + TiO_2$ | 6 |
| $Fe_2O_3$ | 4 |
| $CaO$ | 64 |
| $MgO$ | 2 |
| $SO_3$ | 2 |

The foaming agent has the following composition:
Polyvinyl chloride having a polymerization degree of 1500, 23%; iso-butyl naphthylene sodium sulphonate, 43%; sodium alginate, 15%; potassium hydroxide, 5%; water, 14%. This mixture is beaten together for three minutes and becomes fully foamed. The process is conducted at ambient temperature, as the alginate or ester, unlike methyl cellulose, requires no heating in order to be effective. Next, 216 lbs. of sand are added with 12 lbs. of water and 1.88 lbs. of an aqueous bituminous emulsion containing 55% bituminous material, as described above. The same has the following grain size distribution.

| Screen size, mm.: | Screen passage, by weight |
|---|---|
| 0.2 | 25 |
| 1.0 | 67 |
| 3.0 | 88 |
| 7.0 | 100 |

The foam is further mixed until the sand and bituminous emulsion are uniformly distributed. The final density of the wet foam is 80 lbs. per cubic foot. The concrete contains six sacks of cement per cubic yard and has a water-cement ratio of 0.5 and a sand-cement ratio of 2.3. After setting and curing for 28 days, the concrete has a compressive strength of 300 p.s.i. and a water absorption when immersed of only 3 lbs. per cubic foot per hour. No measurable collapse of the foam was observed at any stage of the process up to setting and curing. Similar results are obtained by the use of the same quantity of ethyl polyacrylate in place of the alginate, but in an aqueous emulsion.

Summary and Comparison of Novel Features

Thus, a number of features of the present invention contribute to the production of a stable foam which also has desirable mechanical properties both when wet and when cured. It has been discovered that the use of abnormally fine mineral filler gives a uniform air bubble distribution throughout the foam. The invention is practiced in the environment of an aqueous slurry of Portland cement, with markedly reduced water content to improve the strength of the cured product, and in this particular environment it has also been discovered that a special subgroup of the alkylnaphthylene sulphonates gives markedly improved foaming. Still further, it has been discovered that certain forms of alginates or polyacrylic acid esters protect the walls of the bubbles from weakening by undue loss of water to the cement during setting. Again, it has also been discovered that polyvinyl chloride or the like mechanically strengthens the bubbles by deposition of particles of the resin in the walls of the bubbles. Thus, the use of the alginates or esters is not to be considered merely alternative to the use of the polyvinyl chloride. While both strengthen the bubbles, they go about it in entirely different ways, for the alginate or ester prevents the bubble walls from becoming starved of water during hydration of the cement, while the resin forms in effect a mechanical reinforcement of the bubble walls. Although it is old to use bituminous emulsions in concrete, it is a further novel feature of this invention to use the bitumen in combination with the polyvinyl chloride, for the bitumen serves to interconnect the polyvinyl chloride in the bubble walls, with the apparent result that a three-dimensional lattice is formed, of which the bubble walls are an integral part, with the grains of filler embedded in this lattice. In short, the only thing conventional about the composition of the present invention is the Portland cement itself. As to the procedural steps, it has been discovered that a stronger but lighter foam is produced by withholding some of the water from the foam forming step and adding the withheld water after the foam is formed.

From a consideration of the foregoing, it will be obvious that all of the initially recited objects of the present invention have been achieved.

It is to be understood that the appended claims are to be accorded a range of equivalents commensurate in scope with the advance made over the prior art.

What is claimed is:

1. A method of making cellular concrete for construction purposes, comprising the steps of forming a mixture of Portland cement, water in the amount of about 25–50% by weight of the cement, and a small but effective amount not less than about 0.3% by weight of the cement of a foaming agent containing about 20–25% by weight of the foaming agent of powdered polyvinyl chloride, about 40–45% by weight of the foaming agent of a water-soluble alkylnaphthylene sulphonate in which the alkyl groups contain 4–10 carbon atoms, about 13–17% by weight of the foaming agent of a member of the class consisting of lower alkyl esters of polyacrylic acid in aqueous emulsion and water-soluble alginates, balance of the foaming agent essentially water, forming a foam by violently agitating the mixture, and adding to the foam finely divided mineral filler of which at least about 20% by weight has a particle size less than 0.2 mm. and of which the maximum particle size is not more than substantially 7 mm.

2. A method of making cellular concrete for construction purposes, comprising the steps of forming a mixture of Portland cement, water in the amount of about 25–50% by weight of the cement, a small amount not less than about 0.06% by weight of the cement of powdered polyvinyl chloride, a small amount not less than about 0.12% by weight of the cement of a water-soluble alkylnaphthylene sulphonate in which the alkyl groups contain 4–10 carbon atoms, and a small amount not less than about 0.04% by weight of the cement of a member of the class consisting of lower alkyl esters of polyacrylic acid in aqueous emulsion and water-soluble alginates, forming a foam by violently agitating the mixture, and adding to the foam finely divided mineral filler of which at least about 20% by weight has a particle size less than 0.2 mm. and of which the maximum particle size is not more than substantially 7 mm.

3. A foamed wet concrete mix of Portland cement, water in the amount of about 25–50% by weight of the cement, mineral filler having at least about 20% by weight of a particle size less than 0.2 mm. and a maximum particle size of not more than substantially 7 mm., a small amount not less than about 0.06% by weight of the cement of powdered polyvinyl chloride, a small amount not less than about 0.12% by weight of the cement of a water-soluble alkylnaphthylene sulphonate in which the alkyl groups contain 4–10 carbon atoms, and a small amount not less than about 0.04% by weight of a member of the class consisting of lower alkyl esters of polyacrylic acid in aqueous emulsion and water-soluble alginates.

4. A foaming agent for cellular concrete, containing about 20–25% by weight of powdered polyvinyl chloride, about 40–45% by weight of a water-soluble alkylnaphthylene sulphonate in which the alkyl groups have 4–10 carbon atoms, and about 13–17% by weight of a member of the class consisting of lower alkyl esters of polyacrylic acid in aqueous emulsion and water-soluble alginates, balance essentially water.

5. A method of making cellular concrete for construction purposes, comprising the steps of forming a mixture of Portland cement, water in the amount of about 25–50% by weight of the cement, and a small but effective amount not less than about 0.3 and not more than about 1% by weight of the cement of a foaming agent containing about 20–25% by weight of the foaming agent of powdered polyvinyl chloride, about 40–45% by weight of the foaming agent of a water-soluble alkylnaphthylene sulphonate in which the alkyl groups contain 4–10 carbon atoms, about 13–17% by weight of the foaming agent of a member of the class consisting of lower alkyl esters of polyacrylic acid in aqueous emulsion and water-soluble alginates, balance of the foaming agent essentially water, forming a foam by violently agitating the mixture, and adding to the foam a granular mineral filler of which at least about 20% by weight has a grain size less than 0.2 mm. and of which the maximum grain size is not more than substantially 7 mm. and a small amount of an aqueous bitumen-in-water emulsion as a water-repelling agent, the bitumen being present in the emulsion in an amount between about 0.5 and 5% by weight of the cement.

6. A method of making cellular concrete for construction purposes, comprising the steps of forming a mixture of Portland cement, water in the amount of about 25–50% by weight of the cement, a small amount not less than about 0.06% and not more than about 0.25% by weight of the cement of powdered polyvinyl chloride, a small amount not less than about 0.12% and not more than about 0.45% by weight of the cement of a water-soluble alkylnaphthylene sulphonate in which the alkyl groups contain 4–10 carbon atoms, and a small amount not less than about 0.04% and not more than about 0.2% by weight of the cement of a member of the class consisting of lower alkyl esters of polyacrylic acid in aqueous emulsion and water-soluble alginates, adding to the foam a granular mineral filler of which at least about 20% by weight has a grain size less than 0.2 mm. and of which the maximum grain size is not more than substantially 7 mm. and a small amount of an aqueous bitumen-in-water emulsion as a water-repelling agent, the bitumen being present in the emulsion in an amount between about 0.5 and 5% by weight of the cement.

7. A foamed wet concrete mix of Portland cement, water in the amount of about 25–50% by weight of the cement, a granular mineral filler having at least about 20% of a grain size less than 0.2 mm. and a maximum grain size of not more than substantially 7 mm., a small amount not less than about 0.06% and not more than about 0.25% by weight of the cement of powdered polyvinyl chloride, a small amount not less than about 0.12% and not more than about 0.45% by weight of the cement of a water-soluble alkylnaphthylene sulphonate in which the alkyl groups contain 4–10 carbon atoms, a small amount not less than about 0.04% and not more than about 0.2% by weight of the cement of a member of the class consisting of lower alkyl esters of polyacrylic acid in aqueous emulsion and water-soluble alginates, and a small amount of an aqueous bitumen-in-water emulsion as a water-repelling agent, the bituman being present in the emulsion in an amount between about 0.5 and 5% by weight of the cement.

References Cited in the file of this patent

UNITED STATES PATENTS

| | | |
|---|---|---|
| 2,432,971 | Ruthman et al. | Dec. 16, 1947 |
| 2,537,190 | Lankou et al. | Jan. 9, 1951 |
| 2,664,365 | La Piana et al. | Dec. 29, 1953 |

FOREIGN PATENTS

| | | |
|---|---|---|
| 84,469 | Netherlands | Mar. 15, 1957 |